United States Patent
Heber et al.

(10) Patent No.: US 10,778,133 B2
(45) Date of Patent: Sep. 15, 2020

(54) METHOD FOR OPERATING AT LEAST ONE ELECTRIC MACHINE

(71) Applicant: AUDI AG, Ingolstadt (DE)

(72) Inventors: Sebastian Heber, Ingolstadt (DE); Martin Adam, Meißen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/037,205

(22) Filed: Jul. 17, 2018

(65) Prior Publication Data

US 2019/0123673 A1 Apr. 25, 2019

(30) Foreign Application Priority Data

Oct. 19, 2017 (DE) .......................... 10 2017 218 661

(51) Int. Cl.
| | |
|---|---|
| H02P 23/14 | (2006.01) |
| B60L 15/20 | (2006.01) |
| H02P 21/20 | (2016.01) |
| H02P 5/74 | (2006.01) |

(52) U.S. Cl.
CPC ............. *H02P 23/14* (2013.01); *B60L 15/20* (2013.01); *H02P 5/74* (2013.01); *H02P 21/20* (2016.02); *B60L 2260/42* (2013.01); *B60L 2260/50* (2013.01); *H02P 2207/05* (2013.01)

(58) Field of Classification Search
None
See application file for complete search history.

(56) References Cited

U.S. PATENT DOCUMENTS

| | | | | |
|---|---|---|---|---|
| 7,495,411 | B2 * | 2/2009 | Kaneko ................... | B60L 50/16 318/801 |
| 2011/0313647 | A1 * | 12/2011 | Koebler .............. | B60L 15/2045 701/123 |
| 2015/0251541 | A1 * | 9/2015 | Drako .................... | B60L 3/106 701/22 |
| 2015/0251658 | A1 * | 9/2015 | Kato ...................... | B60L 3/102 701/22 |

(Continued)

FOREIGN PATENT DOCUMENTS

| | | |
|---|---|---|
| CH | 170 198 A | 6/1934 |
| DE | 1 538 300 A1 | 8/1969 |
| DE | 10 318 246 A1 | 11/2004 |

(Continued)

OTHER PUBLICATIONS

Examination Report dated Jun. 11, 2018 of corresponding German application No. 10 2017 218 661.5; 6 pgs.

(Continued)

*Primary Examiner* — Redhwan K Mawari
*Assistant Examiner* — Melanie J Patrick
(74) *Attorney, Agent, or Firm* — Maier & Maier, PLLC

(57) ABSTRACT

A method for operating at least one electric machine that is designed to drive a vehicle, in which a value is determined for at least one operating parameter of the vehicle, wherein a change is predicted for the torque of the at least one electric machine at a target time point from the value of the at least one operating parameter, wherein a current for a magnetization of the at least one electric machine prior to the target time point is set at a value, wherein the value of the current for the magnetization at the target time point is changed and adapted.

8 Claims, 1 Drawing Sheet

(56) References Cited

U.S. PATENT DOCUMENTS

2015/0275796 A1* 10/2015 Pochner ................. F02D 41/04
    701/104
2018/0065664 A1* 3/2018 Watanabe ............. B60W 10/20

FOREIGN PATENT DOCUMENTS

| DE | 10 2014 213 985 A1 | 1/2016 |
| DE | 10 2015 015 697 A1 | 6/2017 |
| EP | 2 177 390 B1 | 9/2015 |

OTHER PUBLICATIONS

Search Report dated Feb. 5, 2019 in corresponding European Application No. 18181074.8; 10 pages including partial machine-generated English-language translation.

* cited by examiner

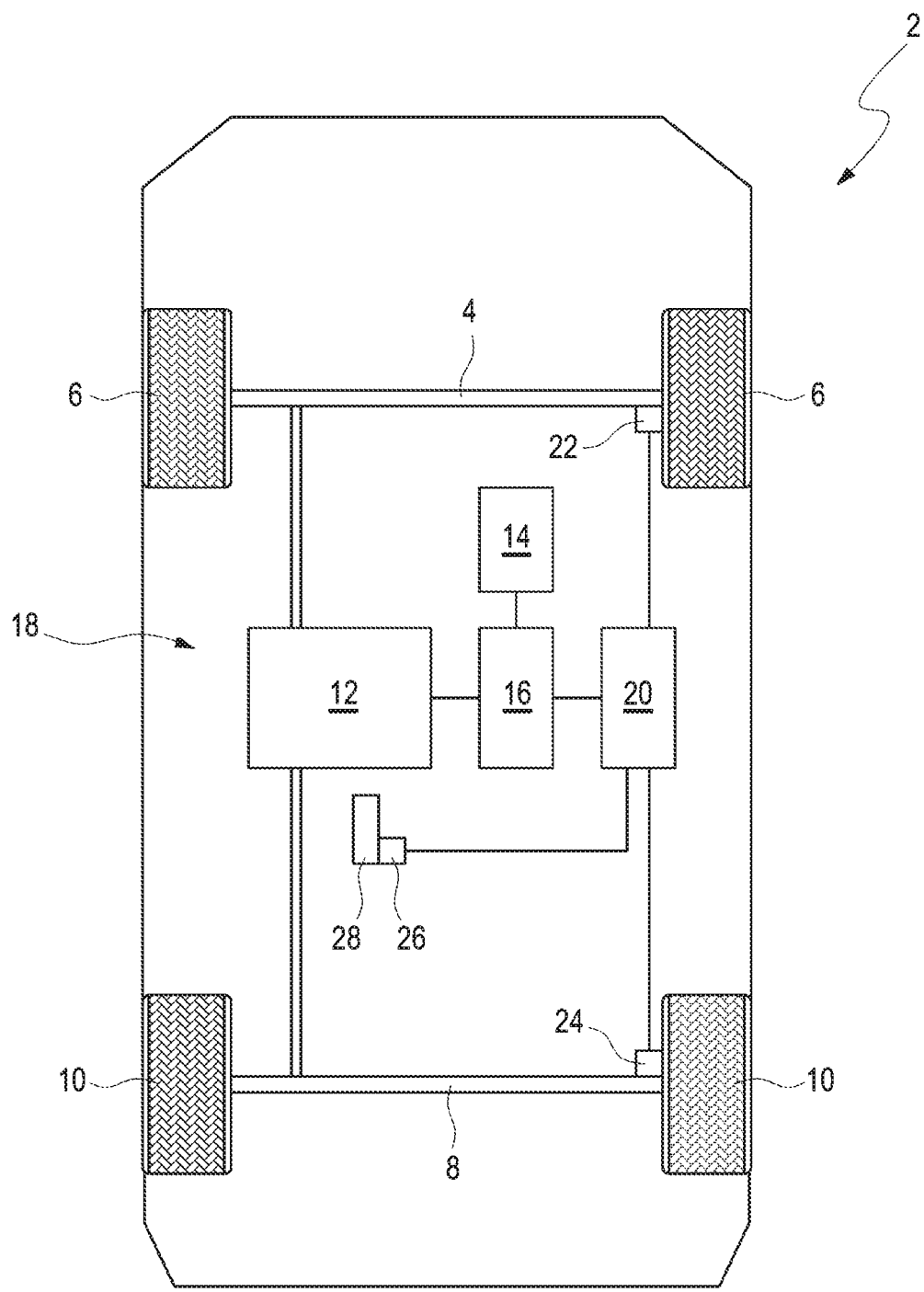

METHOD FOR OPERATING AT LEAST ONE ELECTRIC MACHINE

FIELD

The invention relates to a method for operating at least one electric machine and a system for operating at least one electric machine.

BACKGROUND

A vehicle designed as an electric vehicle may comprise several asynchronous machines as traction drive units. In order to assure the largest possible driving range for the vehicle, the asynchronous machines are operated with minimal losses, wherein a magnetic flux is adapted to a particular operating state or load state. If an operating state is changed, for example, when initiating a passing procedure or upon change in the load distribution between front and rear axle, the magnetic flux is adapted to a new target torque by a regulating system of the machine, so that losses of the asynchronous machines are kept to a minimum. A time curve for magnetizing and demagnetizing can be described by an exponential function. Asynchronous machines can be described by an exponential curve. A time constant, such as a rotor time constant, which is associated with this exponential curve is specific to the machine.

However, a certain amount of time is required for the magnetizing of the asynchronous machines. If a change in the operating state, i.e., in this case the torque, should occur as rapidly as possible, the magnetic flux required for this must already have been adjusted. But if the necessary magnetic flux is permanently set, the magnetization current necessary for this will cause needless losses for all other operating states. These unwanted losses and the desire for a short adjustment time for the torque thus produce a time conflict between the efficiency and the dynamics of the torque.

An asynchronous motor with a performance that is automatically adjustable to a load condition is known from the document CH 170 198 A.

The document DE 1 538 300 A1 describes a control device for maintaining a shaft of a servomotor in an adjustable angle position with a switch which can be actuated by a cam disc.

Document DE 103 18 246 A1 describes a method for controlling the movement of an armature of an electromagnetic actuator for activating a gas exchange value of an internal combustion engine for a motor vehicle.

SUMMARY

Given this background, one object was to adjust the torque of an electric machine according on demand.

This object is achieved by a method and a system with the features of the independent patent claims. Embodiments of the method and of the system will emerge from the dependent patent claims as well as from the description.

The method according to the invention is provided for operating at least one electric machine that is designed to drive a vehicle. In this case, a value is determined for at least one operating parameter of the vehicle, which describes at least one operating state, such as a load state of the vehicle. From this value of the at least one operating parameter, a change is predicted for the torque of the at least one electric machine, for example, due to a dynamic demand placed on the at least one electric machine, at a target time point. A current for a magnetization of the at least one electric machine is set already prior to the target time point, wherein the value of the current for the magnetization is changed and adapted to a value only at the target time point.

In addition, it is possible to also set, besides the value of the current for the magnetization, a value for a current for the torque that is required at the target time point, even prior to the target time point, and to adapt and/or change this at the target time point. In this way, it is possible to set a pair of values for two currents, namely, the value for the current for the magnetization and the value for the current for the torque, depending on the value of the torque that is predicted at the target time point using the at least one operating parameter, prior to the target time point, and to adapt and/or change it at the target time point.

In one embodiment, starting from a current starting time, the future target time point is determined and/or defined or established. Starting from a particular value of the at least one operating parameter, such as a time curve of the value, and possibly based on a time change or derivative of the curve of the value of the at least one operating parameter at the current starting time point, the change in the torque that is dependent on the at least one operating parameter is predictively calculated and thus predicted at the target time point. In this way, the change in the torque that is anticipated at the target time point is determined already at the starting time point. The current for the magnetization and the current for the torque of the at least one electric machine are operating parameters that likewise influence the torque. The required values of the current for the magnetization and of the current for the torque are calculated and thus likewise predicted already at the starting time point. The values for the current for the magnetization and the torque are set at an intermediate time point after the starting time point and before the target time point and are then changed at the target time point and adapted to the change in the torque of the at least one electric machine that was predicted and/or expected at the target time point.

Based on the operating state, a probability is determined for the change in the torque at the target time point, wherein the current for the magnetization and/or the torque is/are set if the probability is at least as high as a threshold value provided for this.

A value of the at least one operating parameter or at least one corresponding operating value of the vehicle is usually detected and/or determined by at least one sensor of the vehicle, the curve of the at least one operating parameter being monitored by a control device of the vehicle based on the values so determined. A particular operating state of the vehicle at the starting time point results based on a current value of the at least one operating parameter. In this case, it is possible to determine actual values resulting from the at least one sensor as the values for the at least one operating parameter and to take them into consideration in the context of the method.

Alternatively or additionally, values of the at least one operating parameter are also determined by the at least one sensor, these values being formed as target values of the at least one operating parameter and are usually dictated by the driver of the vehicle by operating an operator element, such as a pedal. In this case, a sensor is likewise associated with the respective operator element, the sensor detecting the value intended by the driver or the target value for the at least one operating parameter.

A particular operating state of the vehicle results from the particular value of the at least one operating parameter, wherein the operating state is defined on the basis of the respective value. If the at least one value of the operating parameter is dictated by the driver as a target value, e.g., at the given starting time point, the respective current value or actual value of the at least one operating parameter is usually adapted to the given target value, for example, by way of a regulator, which is designed as a component of the control device. Taking into account a regulating process carried out in this case, it is possible in one embodiment to determine the actual value at the target time point as the value of the at least one operating parameter that is adjusted on the basis of the target value given at the starting time point. In this case, the value of the at least one operating parameter resulting at the target time point is already predicted at the starting time point on the basis of the given target value of the at least one operating parameter and/or a current value or actual value of at least one additional operating parameter. Taking this into account, it is possible, even at an intermediate time point, to predictively set the current for the magnetization and/or the torque at the respective given value and to change and thus adapt this value at the target time point.

In one possible embodiment of the method, in addition to the current for the magnetization, the current for forming the torque of the at least one electric machine is also set. Each time, in this case, a value of the current for the magnetization of the at least one electric machine is coordinated with a value for the current for forming the torque of the at least one electric machine. Furthermore, a pairing or a pair of values of these two currents for the magnetization and for forming the torque is continuously monitored in the context of the calculation of the current target value, which is carried out with computer assistance, taking into account characteristic fields and/or iterative search methods. It is possible here to use a characteristic field, for example, describing a relation between the value of the torque and the pair of values for the two currents, i.e., the current for the magnetization and the current for forming the torque. Thus, each time a value, such as a target value for the torque, is matched up with a pair of values for the two currents. If, at the starting time point, the value for the torque and/or its change for the target time point is predicted on the basis of the value of the at least one operating parameter of the vehicle, the value for the current for the magnetization and the value of the current for forming the magnetic field is calculated taking into consideration the at least one characteristic field, matching up the pair of the two values of the current with the value of the torque expected at the target time point. It is possible thereby to detect the present values of the current as well as to continuously predict values of the torque to be expected in future at the target time point and to calculate and thus continuously adapt values for the continuous adapting of the currents as a function of the expected values for the torque in the scope of calculating the target value of the current.

With the current for the magnetization, the at least one electric machine is magnetized already before the target time point, before the target value for the torque is demanded and/or is necessary at the target time point. Thanks to the calculation or target value computation of the target values for the two currents, the pair or the pairing of the values for the currents is continuously adjusted with the aid of an existing magnetization of the at least one electric machine. For example, it is possible to set a predictive magnetization taking into account a maximum available value for the current of a stator of the at least one electric machine. Based on an an actual value or target value of the torque, in a further step, a loss-optimized value for the current for the magnetization is set by calculating the values or target values for the two currents, having the effect, among other things, that a magnetic flux is already established before the target time point, and a required torque for the at least one electric machine is provided at the target time point with no major time delay.

The proposed method, with which it is possible to predictively magnetize the at least one electric machine, can also be carried out for an externally excited synchronous machine, since, in this case, a generating of a magnetic flux of a rotor by an excitation device likewise takes time and can be predictively controlled with the method.

The value of the current for the magnetization and/or the torque is increased or reduced by setting and changing the predetermined value therefor. The value of the current for the magnetization and the value of the current for the torque in one embodiment form the pair of values for the two currents, and these generally correlated values are dependent, by way of the characteristic field, on a correlated value for the expected or required torque, for example.

The value for the at least one operating parameter and thus the at least one operating state is determined with at least one sensor of the vehicle at the starting time point and/or predetermined and/or set by the driver of the vehicle by operating the operator element.

The method is carried out for at least one electric machine, which is designed as an asynchronous machine and/or an externally excited synchronous machine.

Furthermore, a time dependence of the magnetization is described by an exponential function and/or is dependent on a rotor time constant of the at least one electric machine.

In one embodiment, the value of a slip of at least one wheel of the vehicle is determined as the at least one operating parameter. Furthermore, it is possible to take into account the difference in slip of different wheels and/or axles and to set and/or change the value of the current for the magnetization and possibly also the value of the current for the torque as a function thereof. Alternatively or additionally, as the at least one operating parameter, a load on an axle and the value for at least one current, i.e., the current for the magnetization and possibly also the current for the torque, is set and/or changed based on a difference between axle loads or a load distribution on the axles.

The system according to the invention is designed to operate at least one electric machine, which is designed to drive a vehicle. The system comprises a control device which is designed to predict a change in a torque of the at least one electric machine at a target time point based on a value determined for at least one operating parameter of the vehicle, describing at least one operating state of the vehicle at a starting time point. The control device is furthermore designed to cause a current for a magnetization of the at least one electric machine to be set at a value after the starting time point and prior to the target time point and the value of the current for the magnetization to be changed and/or adapted, e.g., increased or reduced, only at the target time point.

In one embodiment, it is additionally possible for the control device to set, besides the value of the current for the magnetization, also a value for a current for the torque of the at least one electric machine already prior to the target time point, and to adapt and/or change this value at the target time point.

The system comprises at least one power electronics unit, which is coordinated with the at least one electric machine and which is designed to provide to the at least one electric machine the current for the magnetization and the current for the torque. The control device is designed to assign the value of the current for the magnetization and for the torque to the at least one power electronics unit.

Furthermore, the system comprises at least one sensor, which is designed to determine the value of the at least one operating parameter of the vehicle and to provide it to the control device. In this way, it is possible for the at least one sensor to be assigned, e.g., to at least one axle and/or to at least one wheel as a component of the vehicle and to be designed to detect a value, generally an actual value, of the operating parameter of the component.

With the method and the system, it is possible to operate a vehicle efficiently and dynamically by predictive or prospective magnetization of the asynchronous machine or externally excited synchronous machine, as examples of the at least one electric machine.

In order to operate the at least one electric machine in loss-optimized manner, at first the magnetic flux optimally suited to the respective operating state of the vehicle is adjusted. By permanent evaluation of the operating state with the aid of the at least one operating parameter of the vehicle and the driver's wish during the driving operation, the current for the magnetization and optionally for the torque is predictively increased as soon as a situation is recognized making likely a high dynamic demand on the torque. In this way, the required magnetic flux is already adjusted at the target time point for a complete torque dynamics. If, later on, an evaluation of the operating state of the vehicle ascertains a constant or slightly dynamic behavior of the torque, for example, for a target value of the torque as operating parameter of the at least one electric machine, the current for the magnetization and optionally also the current for the torque is/are again reduced to a loss-optimized amount.

In this way, it is possible to largely resolve a time conflict between the efficiency and thus the driving range, and a high torque dynamics. The current needed for the magnetic flux for the magnetization and optionally also the current for the torque is/are set in a predominantly loss-optimized manner and is/are predictively increased prior to the actual change in the torque target value in the context of and/or in consideration of the rotor time constant.

For the regulating of the at least one electric machine, at least one information interface is provided in the control device and/or the power electronics unit, making possible the predictive increasing of the current for the magnetization and optionally for the torque. The information required for the predictive increasing of the current for the magnetization and optionally for setting the torque, for example, by way of the value of the at least one operating parameter, is present in at least one control device, for example a control device assembly of the vehicle. Thus, for example, an increased torque dynamics is assumed if the driver selects a sporty mode as the operating state. Furthermore, an increasing of the torque dynamics is assumed and the current for the magnetization and optionally the current for the torque is predictively increased if a larger slip is detected on the front or rear axle as the operating parameter of at least one wheel and the torque needs to be quickly redistributed to non-slipping wheels and/or to at least one axle. In this case, a function is used for estimating a friction value between tires on the wheels and the roadway being driven over as the operating parameter. Such a function may also be used in a conventional vehicle to implement an all-wheel function for the switching in of the rear axle when demanded.

Thanks to the predictive magnetization, the magnetic flux is adapted before the actual change in the load, so that the latency period between the target value and the actual value of the torque is kept as short as possible.

BRIEF DESCRIPTION OF THE DRAWINGS

Further benefits and embodiments of the invention will emerge from the description and the accompanying drawing.

Of course, the features mentioned above and yet to be explained below may be used not only in the particular indicated combination, but also in other combinations or standing alone, without leaving the scope of the present invention.

FIG. 1 comprises a schematic representation of one embodiment of the system according to the invention when implementing one embodiment of the method according to the invention.

DETAILED DESCRIPTION

FIG. 1 shows in schematic representation a vehicle 2 configured here as a motor vehicle with a front axle 4, on which front wheels 6 are arranged, and a rear axle 8, on which rear wheels 10 are arranged, which are in contact with a ground surface on which the vehicle 2 is traveling. For driving vehicle 2, the latter comprises at least one electric machine 12, which is designed to transform electrical energy from at least one battery 14 into mechanical energy and provide this to at least one wheel 6, 10 and/or at least one axle 4, 8. In this process, a value of at least one electrical operating parameter, such as at least one electrical voltage and/or at least one electric current, is set by at least one power electronics unit 16 for the at least one electric machine 12.

The system 18 according to the invention, likewise represented schematically, comprises at least one control device 20 and at least one sensor 22, 24, 26 of the vehicle 2. Each sensor 22, 24, 26 is designed to detect a value of at least one operating parameter or at least one operating value of the vehicle 2 and relay it to the control device 20. At least two sensors 22, 24 are respectively associated with at least one wheel 6, 10 and/or with at least one axle 4, 8 and are designed to determine, as the at least one operating parameter, a slip between at least one tire, which is mounted on at least one wheel 6, 10, and the ground base and/or a load acting on the at least one axle 4, 6. At least one additional sensor 26 is associated with at least one operator element 28 of the vehicle 2, which can be operated by the driver of the vehicle 2, so that the driver can dictate at least one value, generally at least one target value, for at least one operating parameter, this value being detected by the at least one additional sensor 26 and provided to the control device 20. It is possible for the driver to set or to change an operating state of the vehicle, for example, by setting or changing the value of the at least one operating parameter.

In the embodiment of the method according to the invention, at a starting time point, the value of the at least one operating parameter of the vehicle is detected by the at least one sensor 22, 24, 26. This may be, for example, the value of the at least one operating parameter in the form of an actual value resulting from the operation of the vehicle 2 at the starting time point, and detected by the first or second sensor 22, 24.

Alternatively or additionally, the value of the at least one operating parameter is in the form of a target value, which is dictated by the driver through operating the at least one operator element 28 and detected by the additional, third sensor 26.

The value determined and/or detected at the starting time point, i.e., the target value and/or the actual value, of the at least one operating parameter, is relayed by the at least one sensor 22, 24, 26 to the control device 20. A curve of the value of the at least one operating parameter and thus also a current time change or derivative of the value or the curve of the value of the at least one operating parameter is monitored, for example, during a time interval, and transmitted at the starting time point. On this basis, the control device 20 predicts an expected value of the at least one operating parameter at a target time point, which in turn results in a value of the torque of the at least one electric machine 12 at the target time point, which is already predicted before the starting time point. It is furthermore possible to also predict a change in the torque at the target time point on the basis of a future expected course of the torque. On this basis, it is possible to set a value for a current for the magnetization, usually for the magnetizing of the at least one electric machine 12, at an intermediate time point after the starting time point and before the target time point and to further adapt it at the target time point.

On this basis, it is also possible in the embodiment to set a value for a current for setting the torque for the at least one electric machine 12 after the starting time point and before the target time point and to adapt this at the target time point. Thus, in one embodiment, a pair of values is set and adapted for two currents, i.e., the current for the magnetization and a current for the torque. This pair of possibly correlated values for the two currents can be set by using a characteristic field, which is stored in the control device 20, the characteristic field describing a dependency of one value for at least one of the two currents, such as the pair of values for both currents, on the at least one operating parameter, with which the change in the torque is predicted.

A continuous adapting of an optimal pair or an optimal pairing of the currents, i.e., the current for the magnetization and the torque-forming current, is carried out in software by characteristic fields or iterative search methods, i.e., every change in the torque results in a new calculation or current target value calculation for target values of the pair of currents. The continuous adapting of the calculation of the target values for at least one of the currents is carried out at an intermediate time point after the starting time point and before the target time point.

The method is independent of the adjusting of a loss-optimized current for the magnetization. The method is intended for the magnetizing of the at least one electric machine 12 before a target value is commanded for the torque. The calculation or calculation of the target values for the currents then takes over the continuous setting of the pair of currents with the aid of the existing magnetization. The predictive magnetization may be carried out, for example, with the maximum available current of a stator of the at least one electric machine 12. With the aid of the actual target value of the torque, the computation of the target values for the currents then determines in a further step the loss-optimized current for the magnetization with the advantage that a magnetic flux has already been established and the torque may in fact be adjusted with no major time delay.

The proposed method of predictive magnetization also applies to externally excited synchronous machines, since in this case the generating of a magnetic flux of a rotor of the at least one electric machine 12 via an excitation device likewise takes time and can be predictively controlled.

The invention claimed is:

1. A method for operating a vehicle and designing at least one electric machine for driving of the vehicle, comprising:

monitoring a time curve of a value for at least one operating parameter of the vehicle during a time interval before a starting time point;

predicting a change of a torque of the at least one electric machine for a target time point from the time curve of the value of the at least one operating parameter before the starting time point;

determining the value for at least one operating parameter of the vehicle at a starting time point;

setting a current for a magnetization of the at least one electric machine at a required value of the current for the magnetization at an intermediate time point prior to the target time point; and adapting the required value of the current for the magnetization at the target time point, wherein at least one of a slip of at least one wheel of the vehicle and a load of at least one axle of the vehicle is determined as the value of the at least one operating parameter.

2. The method as claimed in claim 1, wherein, based on the value of the at least one operating parameter, a probability is determined for the change in the torque for the target time point, wherein the current for the magnetization is set if the probability is at least as great as a threshold value provided for this.

3. The method as claimed in claim 1, in which the value for the at least one operating parameter is detected with at least one sensor of the vehicle.

4. The method as claimed in claim 1, which is carried out for at least one electric machine that is designed as an asynchronous machine or externally excited synchronous machine.

5. A system for operating at least one electric machine that is designed to drive a vehicle, wherein the system comprises:

a control device that is designed to monitor a time curve of a value for at least one operating parameter of the vehicle during a time interval before a starting time point and predict a change in a torque of the at least one electric machine for a target time point based on the time curve of the value for the at least one operating parameter of the vehicle before the starting time point, wherein the control device is furthermore designed to determine the value for at least one operating parameter of the vehicle at a starting time point and cause a current for a magnetization of the at least one electric machine, at an intermediate time point prior to the target time point, to be set at a required value and the required value of the current for the magnetization at the target time point to be changed, wherein at least one of a slip of at least one wheel of the vehicle and a load of at least one axle of the vehicle is determined as the value of the at least one operating parameter.

6. The system as claimed in claim 5, further comprising:

at least one power electronics unit, which is coordinated with the at least one electric machine, and which is designed to provide the at least one electric machine with the current for the magnetization, wherein the control device is designed to assign the required value of the current for the magnetization to the at least one power electronics unit.

7. The system as claimed in claim 5, further comprising:

at least one sensor that is designed to detect the value of the at least one operating parameter of the vehicle and provide the value to the control device.

8. The system as claimed in claim 6, further comprising:
  at least one sensor that is designed to detect the value of the at least one operating parameter of the vehicle and provide the value to the control device.

\* \* \* \* \*